Dec. 30, 1941.   E. T. TURNER   2,268,357
METHOD AND APPARATUS FOR PRODUCING POWER
Filed March 6, 1939   3 Sheets-Sheet 1

INVENTOR_
EDWARD T. TURNER_
by
his ATTORNEY

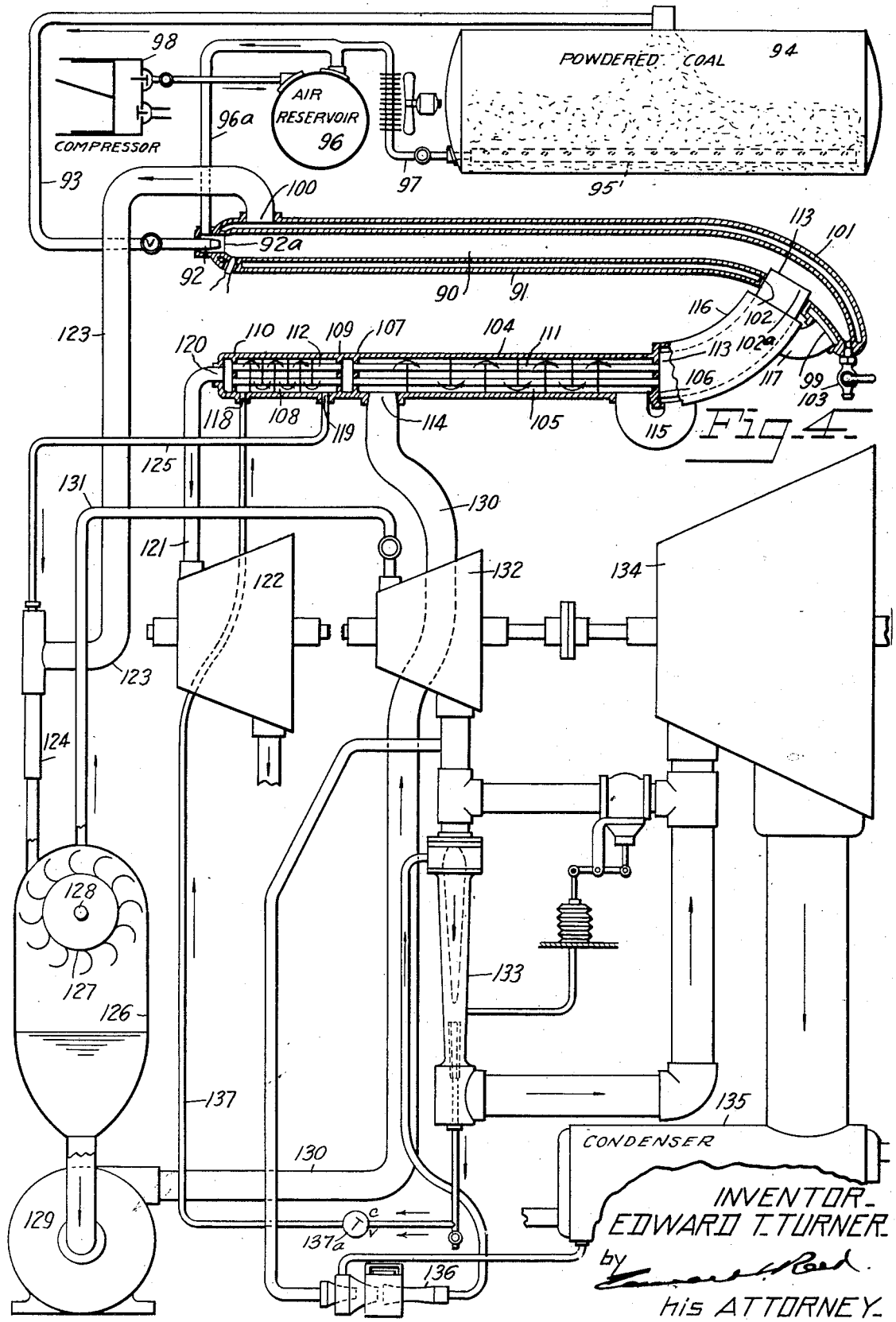

Patented Dec. 30, 1941

2,268,357

UNITED STATES PATENT OFFICE 2,268,357

METHOD AND APPARATUS FOR PRODUCING POWER

Edward T. Turner, Dayton, Ohio

Application March 6, 1939, Serial No. 259,983

12 Claims. (Cl. 60—49)

This invention relates to a method and apparatus for producing power and one object of the invention is to provide a simple, compact and efficient method of producing power.

A further object of the invention is to provide simple, compact and efficient means for heating a liquid to a high temperature under pressure, for use in the production of power.

A further object of the invention is to provide means for effecting the combustion of fuel and utilizing substantially all the heat of combustion in the production of power.

A further object of the invention is to provide means for effecting combustion under pressure to heat a liquid to a high temperature under pressure and for utilizing the pressure energies of both the liquid and the products of combustion in the production of power.

A further object of the invention is to provide a power cycle having substantially the efficiency of the Carnot cycle, combined with a heat generating cycle in which there is a negligible loss of heat.

Other objects of the invention may appear as the method and apparatus are described in detail.

Figure 1:
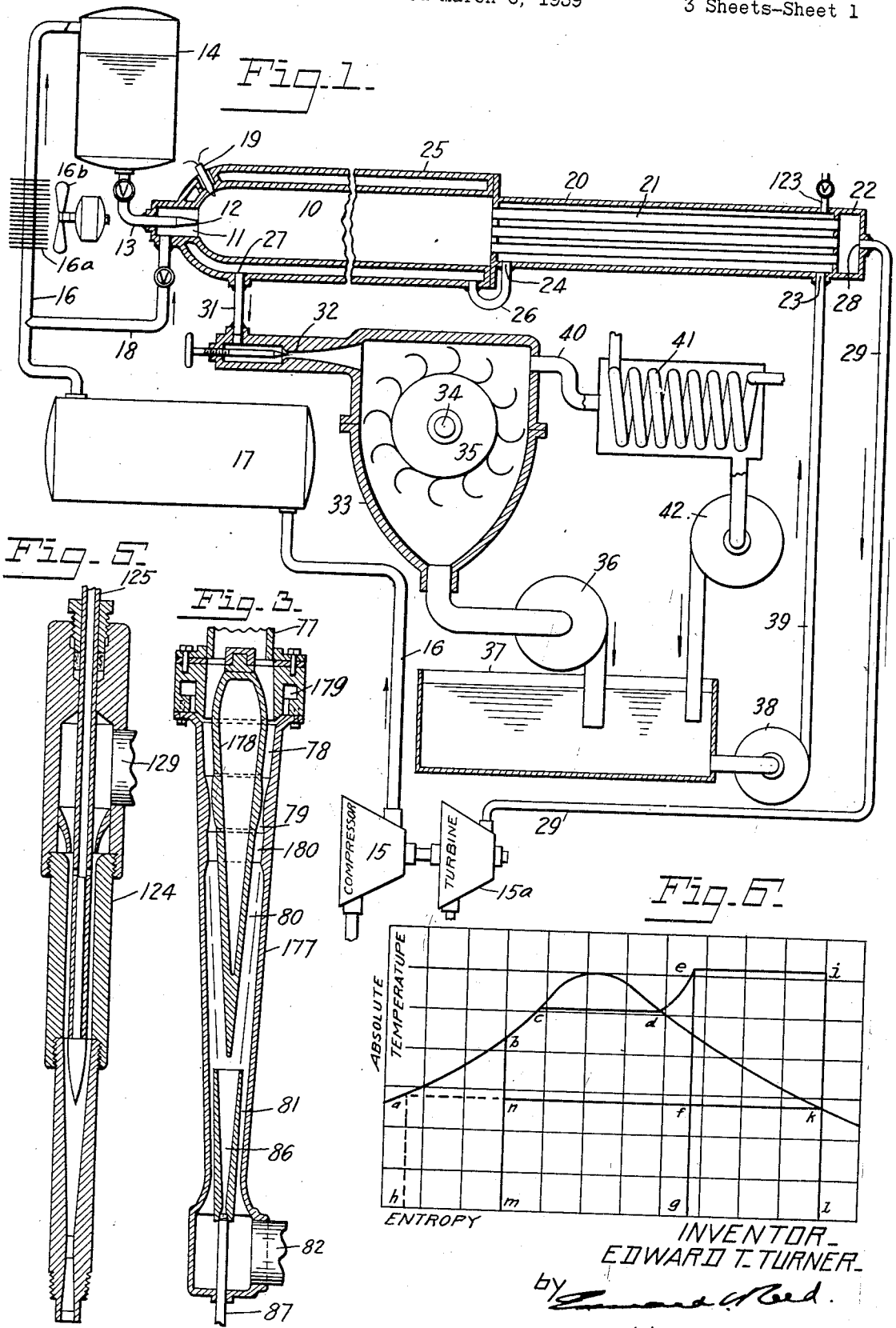
Figure 2:
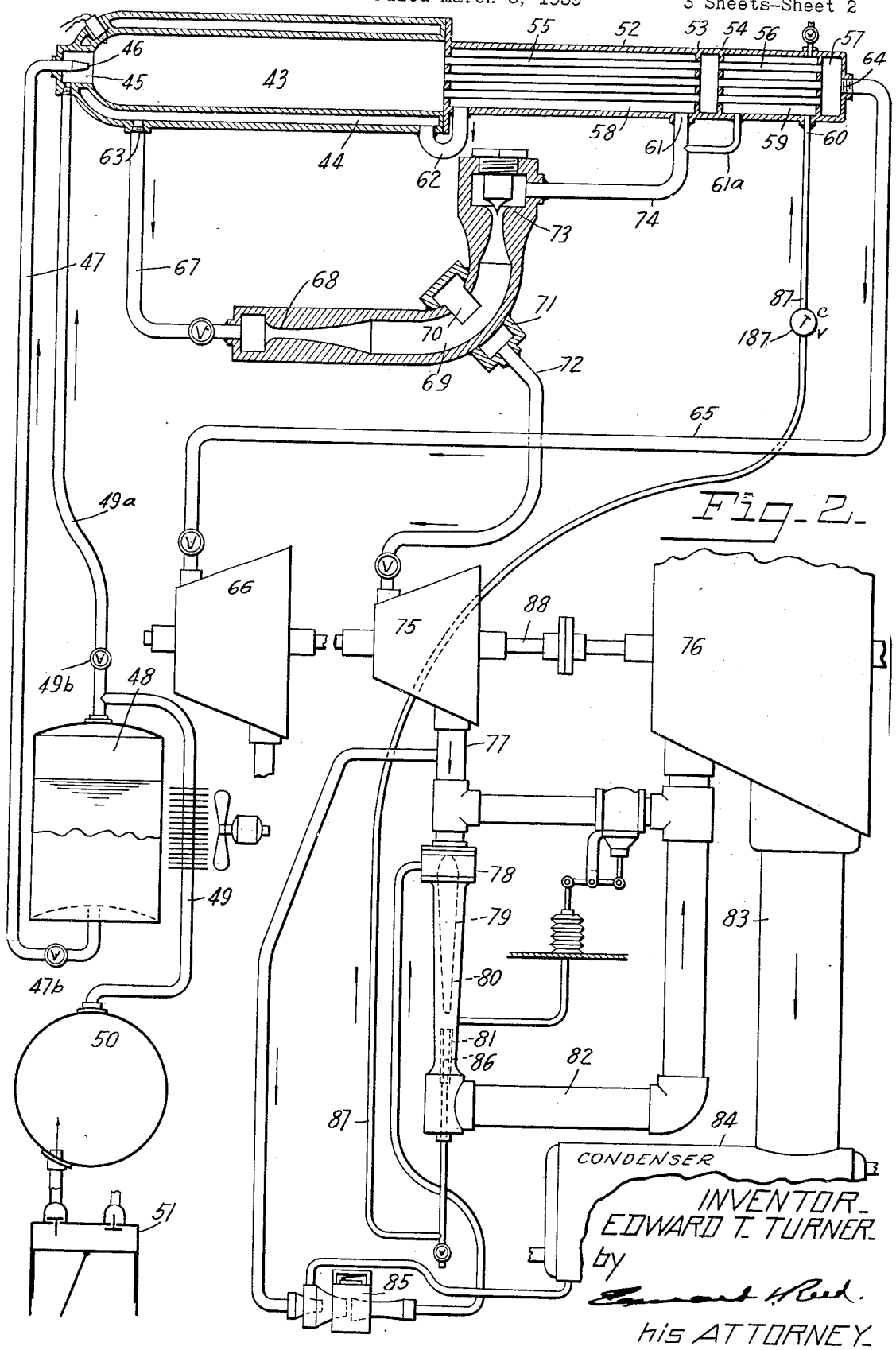

In the accompanying drawings Fig. 1 is a schematic view, partly in section, of an apparatus embodying my invention; Fig. 2 is a schematic view, partly in section, of another form of apparatus embodying my invention; Fig. 3 is a sectional detail view of the device shown in Fig. 2 for compressing low pressure steam; Fig. 4 is a schematic view, partly in section, of another form of apparatus embodying my invention; Fig. 5 is a sectional detail view of the device shown in Fig. 4 for isothermally expanding steam in the propellant; and Fig. 6 is a temperature entropy diagram.

In carrying out my invention I effect combustion of fuel, either fluid fuel or finely divided solid fuel, under pressure and pass the products of combustion in heat exchange relation to a liquid to heat that liquid to a high temperature, under pressure. The products of combustion are reduced to a low temperature and are discharged at high pressure, and the pressure and heat energies of the products of combustion so discharged are converted into mechanical energy, as by expanding the products of combustion through a suitable power unit. The heat and pressure energies of the liquid which has been heated by the products of combustion are also converted into mechanical energy and the liquid is again passed in heat exchange relation to products of combustion. In this manner the major portion of the heat energy of the products of combustion is converted into mechanical energy, as the heat losses are so small as to be practically negligible. This method may be performed by means of apparatus of various kinds and, in the accompanying drawings, I have shown three apparatuses as illustrative of the various ways in which the desired result may be obtained.

Each form of apparatus illustrated comprises two parts, one part including means for effecting combustion, heating the liquid to a high temperature, under pressure, and discharging the products of combustion at high pressure and low temperature, and the second part including means for converting the pressure energy of the discharged products of combustion and the heat and pressure energies of the liquid into mechanical energy. As shown in Fig. 1, the means for heating the liquid and imparting pressure to the products of combustion comprises an elongate closed combustion chamber 10 having at one end a fuel inlet 11 in which is arranged a fuel nozzle 12. This fuel nozzle is connected with a source of supply of any suitable fuel by means of a conduit 13 which, in the present instance, leads to a reservoir 14 for liquid fuel, which is preferably supported at a higher level than the fuel nozzle. Air under pressure is delivered to the upper portion of the reservoir 14 through a pipe 16 from a compressor 15, which is here shown as a rotary compressor and is operated by a power unit 15a, here shown as a turbine. Preferably an air reservoir 17 is interposed in the pipe 16 between the compressor and the fuel reservoir. Air under pressure is also supplied to the combustion chamber 10 where it is mixed with the fuel to provide a combustible mixture and where it serves to create pressure under which combustion is effected. As here shown, a conduit 18 connects the air reservoir 17 with the inlet 11 of the combustion chamber. Due to the pressure in the inlet 11 the fuel is subject to back pressure which tends to balance the pressure in the upper portion of the fuel reservoir, so that the fuel flows to the combustion chamber by gravity. If desired, means may be provided for extracting from the air at least a part of the heat of compression before the air enters the fuel reservoir and, in the present instance, the pipe 16 is provided with heat radiating fins 16a over which air is circulated by a fan 16b. The fuel in the combustion chamber may be ignited in any suitable manner, as by an electrical ignition device 19 mounted in the combustion chamber adjacent the fuel inlet. After the fuel has been ignited the supply of current to the ignition device may be cut off.

Connected with the combustion chamber 10 is a heat exchanger, which may be of any suitable character and, as here shown, comprises an elongate casing 20 secured to the end wall of the combustion chamber and having therein a plurality of tubes 21 which are connected at one end with the combustion chamber and at the other end with a discharge chamber 22 at that end of the casing 20 remote from the combustion chamber, these tubes constituting a passageway for the products of combustion through the heat exchanger. The space within the casing 20, surrounding the tubes 21, constitutes a liquid passageway through the heat exchanger and is provided adjacent the discharge chamber 22 with an inlet 23 through which liquid under pressure is supplied to the heat exchanger. The liquid passageway is also provided at that end adjacent the combustion chamber with a liquid outlet 24, the arrangement of the inlet and outlet being such that the liquid under pressure flows through the heat exchanger in countercurrent heat exchange relation to the products of combustion and is heated by the latter to a high temperature. The counterflow of the liquid and products of combustion imparts a high efficiency to the apparatus but is not essential to the operation thereof. To further heat the liquid and further utilize the heat of the products of combustion the combustion chamber is provided with a liquid passageway extending lengthwise thereof and here shown as a cooling jacket 25 surrounding the combustion chamber, and serving to prevent the overheating thereof. The outlet 24 for the heat exchanger 20 is connected by a conduit 26 with this cooling jacket and the cooling jacket is provided adjacent the fuel inlet to the combustion chamber with an outlet passageway 27, so that the liquid from the heat exchanger continues to flow in countercurrent heat exchange relation to the products of combustion until it is discharged from the outlet 27 and its temperature is thereby materially increased above the temperature of the liquid as it leaves the heat exchanger. The temperature of the products of combustion is, of course, reduced during their passage in heat exchange relation to the liquid, and they are discharged from the heat exchanger at a relatively low temperature. These low temperature products of combustion, which are at high pressure, are discharged from the heat exchanger through a discharge opening 28 and the heat and pressure energies thereof are converted into mechanical energy preferably by expanding the same through a power unit. In the arrangement shown in Fig. 1, the energies of the products of combustion are utilized to operate the air compressor 15 and the discharge opening 28 is connected with the power unit 15a of the compressor by a conduit 29.

Heat and pressure energies of the liquid which is discharged from the cooling jacket 25 are also converted into mechanical energy and for this purpose I have, in Fig. 1, shown an apparatus similar to that shown in my co-pending application Serial No. 187,252, filed January 27, 1938. As shown in Fig. 1 the discharge opening 27 of the cooling jacket for the combustion chamber is connected by a conduit 31 with an expansion nozzle 32 and as the liquid at high pressure and high temperature passes through this nozzle a portion of the liquid is converted or flashed into steam and this steam is expanded in and about the liquid to impart velocity energy to the mixture of steam and liquid. This mixture is discharged at high velocity from the expansion nozzle into a casing 33 in which a power element, such as a Pelton wheel 35, is mounted on a shaft 34 which projects beyond the casing for connection with a device to be operated. After the mixture of steam and liquid has acted on the power element the liquid will separate from the steam in the casing 33 and may be withdrawn from the lower end of the casing, as by a pump 36, and delivered to a tank 37 from which it may be withdrawn by a pump 38 and returned under pressure, through a pipe 39, to the inlet 23 of the heat exchanger 20. The steam passes from the upper end of the casing through a conduit 40 to a condenser 41 from which the condensate may be withdrawn by a pump 42 and delivered to the tank 37, from which it will be returned, along with the other liquid, to the heat exchanger. In order to make up any loss of liquid which may occur the liquid passageway of the heat exchanger is provided with a supplemental inlet 123 which may be connected with an external source of liquid supply.

In that form of apparatus shown in Fig. 2 the means for effecting combustion and heating the liquid are substantially similar to those shown in Fig. 1 and comprise a closed combustion chamber 43 provided with a cooling jacket 44 and having at one end a fuel inlet 45 in which is located a fuel nozzle 46. This nozzle is connected by a conduit 47 with a fuel reservoir 48 which in turn is connected by a conduit 49 with an air reservoir 50 to which air under pressure is supplied by a compressor 51. Air under pressure is also supplied to the combustion chamber 43 through a conduit 49a. The fuel may, if desired, be delivered from the fuel reservoir to the combustion chamber by gravity, as shown in Fig. 1, but in the arrangement of Fig. 2 the fuel reservoir is shown at a level below the fuel nozzle 46 and the air conduits 47 and 49a are provided with throttle valves 47b and 49b, by means of which the pressure on the fuel may be so regulated that the fuel will be fed to the combustion chamber by air pressure. Combustion is effected in the combustion chamber under pressure and the products of combustion are passed through a heat exchanger which is similar to that shown in Fig. 1, with the exception that the liquid passageway therethrough is divided into two parts. As shown the heat exchanger comprises an elongate casing 52 which is divided by partitions 53 and 54 into two parts. Tubes 55 extend through the end wall of the combustion chamber and through the partition 53, and tubes 56 extend through the partition 54 and communicate with a discharge chamber 57. The two sets of tubes constitute a practically continuous passageway for the products of combustion from one end of the heat exchanger to the other, but the space within the casing 52 and surrounding the tubes, which constitutes the liquid passageway, is divided into two parts, 58 and 59. The part 59 of the liquid passageway is provided at one end with an inlet 60 for liquid under pressure and is connected at its other end with an inlet 61 to the part 58 of the liquid passageway by a conduit 61a. That end of the part 58 of the liquid passageway which is adjacent the combustion chamber is connected by a conduit 62 with the cooling jacket 44 of the combustion chamber. Thus water under pressure introduced into the part 59 of the heat exchanger flows successively through the two parts 59 and 58 thereof in heat exchange relation to the products of combustion and is then passed through the cooling jacket 44 of the combustion chamber, so that when it reaches the outlet 63 of the water jacket it is at a high temperature. The products of combustion are discharged at a high pressure and a relatively low temperature through an outlet 64 and are delivered by a conduit 65 to a power unit 66 through which they are expanded to a low pressure, preferably atmospheric pressure. In this arrangement the power unit is shown as a turbine, the power from which may be used for any desired purpose. The products of combustion are preferably, but not necessarily, expanded adiabatically through the power unit.

The liquid discharged from the cooling jacket of the combustion chamber, through the outlet 63, is passed through a conduit 67 to an expansion nozzle 68 in which a portion of the liquid is flashed into steam and that steam expanded in and about the liquid to impart velocity energy to the mixture of steam and liquid. The mixture at this high velocity is discharged from the nozzle into a separator wherein the steam and liquid are separated one from the other and separately discharged from the separator. Any suitable separator may be utilized for this purpose but in the drawings I have illustrated a centrifugal separator of the type shown in my Patent No. 2,190,957, granted February 20, 1940. This separator comprises an arcuate conduit 69 provided in that side thereof having the shorter radius with an opening 70 which communicates with a casing 71 mounted about the conduit 69 and having connected therewith a discharge conduit 72. As the mixture of steam and liquid at a high velocity enters the arcuate separating conduit the liquid, due to its greater specific gravity, will tend to follow the longer or outer surface of the conduit while the steam will separate from the liquid and pass through the opening 70 into the casing 71. The liquid, after being separated from the steam, passes through an expansion nozzle 73 in which its velocity energy is converted into pressure energy and the liquid returned under pressure through a conduit 74 to the inlet 61 of the liquid passageway 58 of the heat exchanger.

A substantial part of the energies of the steam which is thus separated from the liquid and discharged through the conduit 72 is converted into mechanical energy in an apparatus similar to that shown and described in my co-pending application Serial No. 259,982, filed March 6, 1939. That apparatus comprises two power elements here shown as a high pressure turbine 75 and a low pressure turbine 76. The steam is delivered by the conduit 72 to the high pressure turbine 75 through which it is expanded to a lower pressure and is exhausted through a conduit 77 to a compression device. As shown in Fig. 3, this compression device comprises an elongate structure 177 having a tapered opening extending lengthwise thereof, a tapered core 178 being arranged in the opening to form an annular passageway, the larger end portion of which constitutes a mixing chamber 78. The low pressure steam enters the chamber 78 from the conduit 77 and is mixed with water, which is introduced through a passageway 179, the mixture being then expanded through an expansion chamber 79 to impart velocity energy thereto. The mixture is discharged at high velocity from the expansion chamber into a separating chamber 80, an intermediate chamber 180 directing the mixture along and in contact with the tapered core 178, so that it is compressed, or rendered more compact, as it approaches the small end of the core and a substantial part of the steam is squeezed out of the mixture and is discharged laterally therefrom into the outer portion of the separating chamber. This separation is effected without appreciably affecting the velocity of either the separated steam or the remaining portion of the mixture. The separated steam moves along the outer wall of the separating chamber at high velocity into a compression chamber 81 in which it is compressed to a pressure which preferably approximates the pressure of the steam when it is exhausted from the turbine 75. This portion of the steam at said pressure is delivered through a conduit 82, to the lower pressure turbine 76 through which it is expanded and discharged at a still lower pressure through a conduit 83 to a condenser 84. The condensate is withdrawn from the condenser 84 by an injector 85 and delivered to the mixing chamber of the compression device where it serves as the water which is mixed with low pressure steam, the injector being supplied with steam from the conduit 77. The remaining portion of the mixture of low pressure steam and liquid moves along the tapered core and is discharged from the separating chamber 80 into a compression nozzle 86 arranged in line with the small end of the core, and in which the mixture is compressed to a high pressure and the steam therein condensed. The mixture, which is now composed entirely of liquid, is discharged from the nozzle 86 at high pressure and is returned through a pipe 87 to the inlet 60 of the part 59 of the heat exchanger. The conduit 87 is preferably provided with a check valve 187. The liquid from the compression nozzle 86 is delivered to the heat exchanger at a temperature considerably lower than the temperature of the liquid from the separator 69, and the liquid having the lower temperature is introduced into the heat exchanger at a point in advance of the point of introduction of the liquid having the higher temperature, so that the two liquids will be combined at approximately the same temperatures. In the construction here shown the lower temperature liquid is passed through a separate part of the heat exchanger and then mixed with the higher temperature liquid in another part of the heat exchanger but this is not essential as the two liquids may be delivered to a single liquid passageway at separated points. The three power units employed in this form of apparatus may be utilized in any suitable manner. In the present instance all three are connected with a single shaft 88.

In Fig. 4 there is illustrated still another form of apparatus for performing my method and in this form I have also illustrated means for utilizing finely divided solid fuel, such as powdered coal, instead of fluid fuel. As there shown a closed combustion chamber 90 is provided with a cooling jacket 91 and a fuel nozzle 92 extends into an inlet 92a at one end of the combustion chamber. This nozzle is connected by a pipe 93 with a fuel receptacle 94 in which is stored finely powdered coal or the like. Air under pressure is discharged into the mass of powdered coal, through a distributor 95, and escapes through the pipe 93, carrying with it the desired portion of the powdered fuel. Air under pressure is supplied to the distributor 95 from an air reservoir 96 through a conduit 97, air under pressure being delivered to the reservoir from a compressor 98. Air from the reservoir 96 is also delivered through a conduit 96a to the inlet 92a and supplies the air necessary to the combustion of the fuel and maintains the gases in the combustion chamber under pressure so that the fuel is burned under pressure. While I prefer to use air as the propellant for the powdered fuel, as its use simplifies the apparatus, it will be obvious that a non-combustible gas, such as carbon dioxid, may be used for that purpose if desired. The cooling jacket 91 of the combustion chamber is provided at that end remote from the fuel nozzle with a liquid inlet 99 and at that end adjacent the fuel nozzle with a liquid outlet 100. The burning of solid fuel in powdered form results in the formation of more or less ashes and slag, in addition to the gaseous products of combustion, and it is desirable that this solid residue should be separated from the gaseous products of combustion before the latter are delivered to the heat exchanger. For this purpose the combustion chamber is provided at a point remote from the fuel nozzle with an arcuate portion, and, as here shown, the end portion 101 of the combustion chamber is curved about a transverse axis. This curved portion 101 of the combustion chamber is provided in that wall thereof having the shorter radius with an opening 102. The products of combustion move through the combustion chamber under pressure and at a considerable velocity and as the products of combustion enter the curved portion of the chamber the ash dust will tend to follow the upper or longer wall of the chamber, while the slag will move along the lower wall. The gases will separate from the solid residue and escape through the opening 102 substantially free from solid matter, the opening being surrounded by a flange 102a to prevent the slag from entering the same. The solid matter passes beyond the opening and accumulates in the outer end portion of the combustion chamber, from which it may be withdrawn through a valve controlled outlet 103.

The gaseous products of combustion which escape under pressure through the opening 102 are delivered to a heat exchanger which comprises an elongate casing 104 divided into two parts, the longer part 105 being closed at one end by a partition 106 and at its other end by a partition 107. The shorter part 108 is closed at one end by a partition 109 adjacent the partition 107 and is closed at its other end by a partition 110. Tubes 111 in the part 105 of the casing are supported at their ends in the partitions 106 and 107 and tubes 112 in the part 108 of the casing are supported at their ends in the partitions 109 and 110 and these two sets of tubes constitute a practically continuous passageway through the heat exchanger for products of combustion. The tubes 111 communicate beyond the partition 106 with a conduit 113 which extends into the opening 102 in the wall of the combustion chamber, and preferably extends inwardly slightly beyond that wall to form the flange 102a. The part 105 of the heat exchanger is provided near the partition 107 with a liquid inlet 114 for liquid under pressure and it is connected near its other end, by a conduit 115, with a passageway 116, here shown as a sleeve arranged about and spaced from the conduit 113, and this passageway is connected with the inlet 99 of the cooling jacket 91 of the combustion chamber by a conduit 117. The liquid entering the heat exchanger through the inlet 114 flows through the liquid passageway 105, the conduit 116 and cooling jacket 91 to the outlet 100. The liquid passageway 108 of the heat exchanger is provided with an inlet 118 and an outlet 119 so arranged that the liquid will flow through the passageway 108 countercurrent to the products of combustion and will be heated thereby. The products of combustion are discharged from the heat exchanger at high pressure through an outlet 120 and are then delivered through a conduit 121 to a power element, such as a turbine 122, through which they are expanded to a very low pressure, and inasmuch as the products of combustion have given up by far the greater part of their heat to the liquid they are exhausted to waste at a relatively low temperature.

The liquid which is circulated through the passageway 105 of the heat exchanger and the cooling jacket of the combustion chamber is herein characterized as a propellant and is preferably an oil. The liquid which circulates through the liquid passageway 108 of the heat exchanger may be of any suitable character but is preferably water. The propellant which is discharged from the cooling jacket 91 at high temperature and high pressure is conducted through a conduit 123 to a mixing and expanding device 124, Figs. 4 and 5, of the type shown in the aforesaid Patent No. 2,190,957. The water from the part 108 of the heat exchanger is delivered through a conduit 125 to the device 124 where it is mixed with the highly heated propellant and flashed into steam, and this steam is then expanded isothermally in and about the propellant to impart propellant energy to the mixture of steam and propellant. This mixture is discharged at high velocity into a casing 126 in which a power element, such as a Pelton wheel 127, is mounted on a shaft 128. The propellant and steam separate in the casing 126 and the propellant is withdrawn from the lower portion of the casing, by a pump 129, and returned under pressure through a conduit 130 to the inlet 114 of the part 105 of the heat exchanger. The steam is discharged from the upper portion of the casing 126 through a conduit 131 to the high pressure power element 132 of a two-stage apparatus of the type shown in Fig. 2, through which it is expanded adiabatically to a lower pressure, and is delivered at said lower pressure to a compression device 133. As explained in connection with Fig. 2 a portion of this low pressure steam is then expanded adiabatically through the low pressure power unit 134 and condensed in a condenser 135. The condensate is withdrawn from the condenser by an ejector 136 and delivered to the compression device 133 in which it is mixed with another portion of low pressure steam and the mixture compressed to a high pressure and returned through a conduit 137 to the inlet 118 of the part 108 of the heat exchanger, the conduit 137 being preferably provided with a check valve 137a.

In the accompanying drawings I have illustrated three forms of apparatus for heating the liquid to a high temperature and for imparting high pressure to the discharged products of combustion, and have associated with each of these three forms of heating apparatus a different form of apparatus for converting the heat and pressure energies of the liquid into mechanical energy. It will be understood, however, that in each instance any suitable form of heating apparatus or of converting apparatus may be utilized.

The herein described method and apparatus utilizes the heat of combustion to a much greater extent than is possible with the usual steam plant and therefore results in substantial saving of fuel. As illustrative of this increased efficiency there is shown in Fig. 6 a temperature entropy diagram in which is indicated the relative efficiencies of the usual steam plant and of the present apparatus. The diagram relates more particularly to the apparatus shown in Fig. 4 and is based on the use of dry and superheated steam. The useful energy derived from the ordinary steam plant is indicated by the area *abcdefa* and the wasted energy of such plant is indicated by the area *afgha*. The useful energy derived from the present apparatus is indicated by the area *nbcdejkn* and the wasted energy of that apparatus is indicated by the area *nklmn*. The efficiency of the plant is represented in each instance by the ratio of the useful energy to the total energy and it will be noted that the ratio of useful energy to total energy in the present apparatus is substantially greater than the ratio of useful energy to total energy in the ordinary plant.

While I have described my method and have illustrated three forms of apparatus for performing that method I wish it to be understood that I do not desire to be limited to the details of either the method or of the apparatus as various modifications may occur to a person skilled in the art.

Having now fully described my invention, what I claim as new and desire to secure by Letters Patent, is:

1. A method of producing power which comprises burning fuel under pressure in a combustion chamber to impart pressure energy to the products of combustion, passing said products of combustion in heat exchange relation to liquid under pressure to reduce said products of combustion to a relatively low temperature and to heat said liquid to a high temperature, generating steam within said liquid and expanding said steam in said liquid to impart velocity energy to the mixture of steam and liquid, separating the steam from the liquid, converting velocity energy of the separated steam into mechanical energy, converting velocity energy of said liquid into pressure energy and utilizing said pressure energy to again pass said liquid in heat exchange relation to said products of combustion.

2. A method of producing power which comprises burning fuel under pressure in a combustion chamber to impart pressure energy to the products of combustion, passing said products of combustion in heat exchange relation to liquid under pressure to reduce said products of combustion to a relatively low temperature and to heat said liquid to a high temperature, generating steam within said liquid and expanding said steam in said liquid to impart velocity energy to the mixture of steam and liquid, separating the steam from the liquid, expanding said steam through a power unit, compressing a portion of the expanded steam and again expanding the same through another power unit, mixing another portion of said steam with liquid, compressing said mixture of steam and liquid to a high pressure and passing the same in heat exchange relation to said products of combustion.

3. A method of producing power which comprises burning fuel under pressure in a combustion chamber to impart pressure energy to the products of combustion, passing said products of combustion in heat exchange relation to liquid under pressure to reduce said products of combustion to a relatively low temperature and to heat said liquid to a high temperature, generating steam within said liquid and expanding said steam in said liquid to impart velocity energy to the mixture of steam and liquid, utilizing said mixture at said velocity to operate a power unit, separating the liquid from the steam and again passing the liquid under pressure in heat exchange relation to said products of combustion, expanding the steam through a second power unit to a lower presure, mixing said low pressure steam with a liquid and expanding the same to impart velocity energy to the mixture of steam and liquid, separating a portion of the steam from said mixture, compressing the separated steam and then expanding the same through a third power unit, compressing the remaining portion of said mixture to impart high pressure thereto and to condense the steam in said mixture and utilizing said pressure to again pass the mixture in heat exchange relation to said products of combustion.

4. The method of producing power which comprises burning fuel under pressure in a closed combustion chamber to impart pressure energy to the products of combustion, passing a liquid propellant under pressure and water separately in heat exchange relation to said products of combustion to reduce the latter to a low temperature, to heat said propellant to a high temperature under pressure and to heat said water, converting the pressure energy of said products of combustion into mechanical energy, mixing said water with said propellant to convert the water into steam, isothermally expanding said steam to impart velocity energy to said mixture of steam and propellant, utilizing said mixture at said velocity to operate a power unit, separating the propellant and the steam and again passing the propellant in heat exchange relation to said products of combustion, and converting the heat and pressure energies of the separated steam into mechanical energy.

5. The method of producing power which comprises burning fuel under pressure in a closed combustion chamber to impart pressure energy to the products of combustion, passing a liquid propellant under pressure and water separately in heat exchange relation to said products of combustion to reduce the latter to a low temperature, to heat said propellant to a high temperature under pressure and to heat said water, converting the pressure energy of said products of combustion into mechanical energy, mixing said water with said propellant to convert the water into steam, isothermally expanding said steam to impart velocity energy to said mixture of steam and propellant, utilizing said mixture at said velocity to operate a power unit, separating the propellant and the steam and again passing the propellant in heat exchange relation to said products of combustion, expanding the separated steam adiabatically through a power unit to a lower pressure, mixing water with said low pressure steam and expanding the mixture to impart velocity energy thereto, separating a portion of the steam from said mixture, expanding the separated steam through another power unit, adiabatically compressing the remaining portion of said mixture of steam and water to a higher pressure to condense the steam in said mixture and passing said mixture in heat exchange relation to said products of combustion.

6. In a power apparatus, a closed combustion chamber having a fuel inlet, means for delivering fuel and air under pressure to said inlet and burning said fuel under pressure in said combustion chamber to impart high pressure to the products of combustion, a heat exchanger having a passageway connected with said combustion chamber to receive said products of combustion therefrom at said high pressure and having a passageway for liquid arranged to cause liquid under pressure to flow in heat exchange relation to the products of combustion and to be heated to a high temperature, said heat exchanger having an outlet through which the products of combustion are discharged at high pressure and relatively low temperature, a power unit connected with the outlet for said heat exchanger to receive the discharged products of combustion at said high pressure and low temperature, means for converting a portion of the liquid discharged from said heat exchanger into steam and expanding said steam in said liquid to impart velocity energy to the mixture of steam and liquid, means for separating the steam from the liquid at said velocity, means for converting velocity energy of the separated steam into mechanical energy, and means for converting velocity energy of the separated liquid into pressure energy and returning said liquid to said heat exchanger.

7. In a power apparatus, a closed combustion chamber having a fuel inlet, means for delivering fuel and air under pressure to said inlet and burning said fuel under pressure in said combustion chamber, a heat exchanger having a passageway for products of combustion connected with said combustion chamber and having a passageway for liquid arranged to cause liquid under pressure to flow in heat exchange relation to the products of combustion and to be heated to a high temperature, said heat exchanger having an outlet through which the products of combustion are discharged at high pressure and relatively low temperature, a power unit connected with the outlet for said heat exchanger for operation by the products of combustion discharged therefrom, means for converting a portion of the liquid discharged from said heat exchanger into steam and expanding said steam in another portion of said liquid to impart velocity energy to the mixture of steam and liquid, means for separating the steam from the liquid, a second power unit, means for expanding said separated steam through said second power unit and exhausting the same therefrom at a relatively low pressure, means for mixing liquid with steam exhausted from said second power unit, means for separating a portion of the steam from said mixture of steam and liquid, a third power unit, means for expanding said separated steam through said third power unit, and means for compressing the remaining portion of said steam and said liquid to a high pressure and returning the same to said heat exchanger.

8. In a power apparatus, a closed combustion chamber having a fuel inlet, means for delivering fuel and air under pressure to said inlet and burning said fuel under pressure in said combustion chamber, a heat exchanger having a passageway for products of combustion connected with said combustion chamber and having a passageway for water and a separate passageway for propellant arranged to cause propellant under pressure to flow in heat exchange relation to said products of combustion to be heated to a high temperature, means for mixing water from said water passageway with said propellant at high temperature and high pressure to convert said water into steam and for expanding said steam in said propellant to impart velocity energy to the mixture of steam and propellant, and means for converting velocity energy of said mixture into mechanical energy.

9. In a power apparatus, a closed combustion chamber having a fuel inlet, means for delivering fuel and air under pressure to said inlet and burning said fuel under pressure in said combustion chamber, a heat exchanger having a passageway for products of combustion connected with said combustion chamber and having a passageway for water and a separate passageway for propellant arranged to cause propellant under pressure to flow in heat exchange relation to said products of combustion and to be heated to a high temperature, means for mixing water from said water passageway with said propellant at said high temperature and high pressure to convert said water into steam and for expanding said steam in said propellant to impart velocity energy to the mixture of steam and propellant, means for converting velocity energy of said mixture into mechanical energy, said heat exchanger having an outlet through which the products of combustion are discharged at high pressure, and means for converting the pressure energy of said products of combustion into mechanical energy.

10. In a power apparatus, a closed combustion chamber having a fuel inlet, means for delivering fuel and air under pressure to said inlet and burning said fuel under pressure in said combustion chamber, a heat exchanger having a passageway for products of combustion connected with said combustion chamber and having a passageway for water and a separate passageway for propellant arranged to cause the propellant under pressure to flow in heat exchanger relation to said products of combustion and to be heated to a high temperature, means for mixing water from said water passageway with said propellant at high temperature and high pressure to convert said water into steam and for isothermally expanding said steam in said propellant to impart velocity energy to the mixture of steam and propellant, a casing connected with said expanding means to receive said mixture therefrom at high velocity, a power element arranged in said casing to be actuated by said mixture, a power unit, means for withdrawing steam from said casing and adiabatically expanding the same through said power unit to a lower pressure, means for condensing said low pressure steam and returning the same to said water passageway of said heat exchanger, and means for withdrawing propellant from said casing and returning the same to said propellant passageway of said heat exchanger.

11. In a power apparatus, a closed combustion chamber having a fuel inlet, means for delivering fuel and air under pressure to said inlet and burning said fuel under pressure in said combustion chamber, a heat exchanger having a passageway for products of combustion connected with said combustion chamber and having a passageway for water and a separate passageway for propellant arranged to cause propellant under pressure to flow in heat exchange relation to said products of combustion and to be heated to a high temperature, means for mixing water from said water passageway with said propellant at high temperature and high pressure to convert said water into steam and for isothermally expanding said steam in said propellant to impart velocity energy to the mixture of steam and propellant, a casing connected with said expanding means to receive said mixture therefrom at high velocity, a power element arranged in said casing to be actuated by said mixture, a power unit, means for withdrawing steam from said casing and adiabatically expanding the same through said power unit to a lower pressure, a second power unit, means for expanding a portion of said low pressure steam through said second power unit, means for mixing liquid with steam from the first mentioned power unit, means for compressing the mixture of steam and liquid to a high pressure and returning the same to the water passageway of said heat exchanger, means for withdrawing propellant from said casing and returning the same to said propellant passageway of said heat exchanger, said heat exchanger havi 3 an outlet through which the products of combustion are discharged at high pressure, and a power unit connected with said outlet to convert the pressure energy of said products of combustion into mechanical energy.

12. In a power apparatus, an elongate closed combustion chamber having a fuel inlet at one end thereof and having near its other end a portion curved about a transverse axis, means for introducing powdered fuel and air under pressure into said combustion chamber and burning said fuel therein in suspension and under pressure, said curved portion of said combustion chamber being provided on that side thereof having the shorter radius with an outlet for gaseous products of combustion, a heat exchanger having a passageway for products of combustion connected with said outlet of said combustion chamber and also having a passageway for liquid arranged to cause liquid under pressure to flow in heat exchange relation to said products of combustion and to be heated thereby to a high temperature, means for converting heat and pressure energies of said liquid into mechanical energy, said heat exchanger having an outlet through which said products of combustion are discharged at high pressure, and means for converting the pressure energy of said products of combustion into mechanical energy.

EDWARD T. TURNER.